US011087121B2

(12) United States Patent
Bourlai et al.

(10) Patent No.: US 11,087,121 B2
(45) Date of Patent: Aug. 10, 2021

(54) HIGH ACCURACY AND VOLUME FACIAL RECOGNITION ON MOBILE PLATFORMS

(71) Applicant: West Virginia University, Morgantown, WV (US)

(72) Inventors: Thirimachos Bourlai, Morgantown, VA (US); Michael Martin, Morgantown, VA (US)

(73) Assignee: WEST VIRGINIA UNIVERSITY, Morgantown, WV (US)

( * ) Notice: Subject to any disclaimer, the term of this patent is extended or adjusted under 35 U.S.C. 154(b) by 225 days.

(21) Appl. No.: 16/376,345

(22) Filed: Apr. 5, 2019

(65) Prior Publication Data

US 2019/0311184 A1 Oct. 10, 2019

Related U.S. Application Data

(60) Provisional application No. 62/653,156, filed on Apr. 5, 2018.

(51) Int. Cl.
*G06K 9/00* (2006.01)
*G06F 16/51* (2019.01)
*G06F 16/532* (2019.01)

(52) U.S. Cl.
CPC ......... *G06K 9/00288* (2013.01); *G06F 16/51* (2019.01); *G06F 16/532* (2019.01); *G06K 9/00228* (2013.01)

(58) Field of Classification Search
None
See application file for complete search history.

(56) References Cited

U.S. PATENT DOCUMENTS

| 6,661,907 | B2 | 12/2003 | Ho et al. |
| 7,127,086 | B2 | 10/2006 | Yuasa et al. |
| 7,130,454 | B1 | 10/2006 | Berube et al. |
| 7,412,081 | B2 | 8/2008 | Doi |
| 7,460,693 | B2 | 12/2008 | Loy et al. |
| 8,254,691 | B2 | 8/2012 | Kaneda et al. |

(Continued)

FOREIGN PATENT DOCUMENTS

| CN | 103440479 B | 12/2016 |
| EP | 1629415 B1 | 4/2007 |

(Continued)

OTHER PUBLICATIONS

Huang, Gary B., et al. "Labeled faces in the wild: A database forstudying face recognition in unconstrained environments." Workshop on faces in'Real-Life'Images: detection, alignment, and recognition. 2008. (Year: 2008).*

(Continued)

*Primary Examiner* — Sean M Conner
(74) *Attorney, Agent, or Firm* — Thomas | Horstemeyer, LLP

(57) ABSTRACT

Disclosed are systems and methods related to facial recognition. An image of a subject can be captured via a camera on a mobile device. The image can be classified according to a device type, whether the image is captured indoors or outdoors, and a standoff distance. Facial features can be extracted from the image based on the image category. The facial features can be compared with a predefined set of facial features in a database. An identification of the subject can be made in response to the comparison.

17 Claims, 16 Drawing Sheets

(56) References Cited

U.S. PATENT DOCUMENTS

| | | | |
|---|---|---|---|
| 8,280,120 B2 | 10/2012 | Hoyos | |
| 9,449,217 B1 | 9/2016 | Bourlai | |
| 9,652,633 B2 | 5/2017 | Lau et al. | |
| 2010/0074479 A1* | 3/2010 | Chou | G06K 9/00221 |
| | | | 382/118 |
| 2014/0072185 A1* | 3/2014 | Dunlap | G06K 9/00288 |
| | | | 382/118 |
| 2018/0336399 A1* | 11/2018 | Gernoth | G06F 15/76 |

FOREIGN PATENT DOCUMENTS

| | | |
|---|---|---|
| JP | 3469031 B2 | 11/2003 |
| JP | 4156430 B2 | 9/2008 |
| JP | 4755202 B2 | 8/2011 |
| JP | 4862447 B2 | 1/2012 |
| JP | 5008269 B2 | 8/2012 |
| JP | 5010905 B2 | 8/2012 |
| KR | 101185525 B1 | 9/2012 |
| KR | 101393717 B1 | 5/2014 |
| KR | 101415287 B1 | 7/2014 |

OTHER PUBLICATIONS

Bourlai, Thirimachos, Nikolaos Mavridis, and Neeru Narang. "On designing practical long range near infrared-based face recognition systems." Image and Vision Computing 52 (2016): 25-41. (Year: 2016).*

Florian Schroff, et al.; FaceNet: A Unified Embedding for Face Recognition and Clustering; The IEEE Conference on Computer Vision and Pattern Recognition (CVPR), 2015, pp. 815-823.

Brandon Amos, et al., "OpenFace: A general Purpose Face Recognition Library with Mobile Applications"; School of Computer Science, Carnegie Mellon University, Jun. 2016, CMU-CS-16-118.

N. Narang, et al., "Learning Deep Features for Hierarchical Classification of Mobile Phone Face Datasets in Heterogeneous Environments," 2017 12th IEEE International Conference on Automatic Face & Gesture Recognition (FG 2017), Feb. 16, 2016.

J Liu, et al. "Targeting ultimate accuracy: Face recognition via deep embedding" Baidu Research—Institute of Deep Learning, Jun. 24, 2015.

Lane, et al. "DeepX: A Software Accelerator for Low-Power Deep Learning Inference on Mobile Devices", 2016 IEEE International Conference on Information Processing in Sensor Networks, Apr. 11-14, 2016.

E Vazquez-Fernandez, et al. "Face recognition for authentication on mobile devices", Biometrics Institute, Apr. 5, 2016.

S. Chen, et al., "MobileFaceNets: Efficient CNNs for Accurate Real-Time Face Verification on Mobile Devices", School of Computer and Information TEchnology, Beijing Jiaotong University, Beijing, China, Apr. 2018.

Z Liu, et al., "Deep Learning Faces Attributes in the Wild", 2015 IEEE International Conference on Computer Vision, Dec. 7-13, 2015.

J Yang, et al. "Stacked Hourglass Network for Robust Facial landmark Localisation", 2017 IEEE Conference on Computer Vision and Pattern Recognition Workshops, Jul. 21-26, 2017.

M. Zeng, et al., "Convolutional Neural Networks for Human Activity Recognition Using Mobile Sensors", IEEE 6th International Conference on Mobile Computing, Applications and Services, Nov. 6-7, 2014.

S Balaban, et al., "Deep Learning and Face Recognition: The State of the Art", Defense + Security Symposium 2015.

N. Narang, et al., "Learning Deep Features for Hierarchical Classification of Mobile Phone Face Datasets in Heterogeneous Environments", 12th IEEE International Conference on Automatic Face & Gesture Recognition (FG 2017), Jun. 2017.

H. Alshamsi, et al., "Real Time Facial Expression Recognition App Development on Mobile Phones", 2017 12th International Conference on Automatic Face & Gesture Recognition, May 30-Jun. 3, 2017.

M. Guenther, et al., "Unconstrained Face Detection and Open-Set Face Recognition Challenge", 2017 IEEE International Joint Conference on Biometrics, Oct. 1-4, 2017.

A Polyak, et al., "Channel-Level Acceleration of Deep Face Representations", IEEE (vol. 3, Oct. 26, 2015, pp. 2163-2175.

T. Soyata, et al., "Cloud-vision: Real-time face recognition using a mobile-cloudlet-cloud acceleration architecture", 2012 IEEE Symposium on Computers and Communications, Jul. 1-4, 2012.

Wang, et al., Biometrics on Mobile Phone, Recent Application in Biometrics, Jul. 17, 2011.

Kemelmacher-Shlizerman, et al., "The MegaFace Benchmark: 1 Million Faces for Recognition at Scale", 2016 IEEE Conference on Computer Vision and Pattern Recognition, Jun. 27-30, 2016.

"Apple Applies for Face Recognition Patent", retrieved from: https://www.themobileindian.com/news/apple-applies-for-face-recognition-patent-3673, dated Aug. 16, 2018.

"Apple wins patent for automatic retrying of a failed facial recognition authentication process" retrieved from https://www.patentsandtech.com/apple-wins-patent-for-automatic-retrying-of-a-failed-facial-recognition-authentication-process/, dated Jun. 1, 2019.

"Samsung Patents New Face, Iris Recognition Biometric Camera; May Take on Apple's Face ID" retrieved from: https://gadgets.ndtv.com/mobiles/news/samsung-patent-biometric-camera-apple-iphone-x-face-id-1880216, dated Jul. 9, 2018.

* cited by examiner

Classification results from CNN: Phone Type.

| Class Type: iPhone 5S vs. Samsung S4 Zoom vs. Nokia 1020 vs. Samsung S5 ||
|---|---|
| Scenario 1: Training DB2 and Testing DB1 ||
| Accuracy | 0.40 |
| Scenario 2: Training DB1 and Testing DB1 ||
| Datasets | Set 1 | Set 2 |
| Accuracy | 0.71 | 0.69 |
| Scenario 3: Training DB1+DB2 and Testing DB1 ||
| Datasets | Set 1 | Set 2 |
| Accuracy | 0.75 | 0.70 |

Classification results from CNN: Indoor vs. Outdoor

| Datasets | set 1 | set 2 | set 3 | set 4 | set 5 |
|---|---|---|---|---|---|
| Samsung S4 Zoom | | | | | |
| train 10% | 78.05 | 70.35 | 80.52 | 50.0 | 82.70 |
| train 20% | 86.84 | 90.39 | 83.55 | 91.56 | 87.87 |
| train 30% | 88.97 | 50.00 | 89.71 | 89.34 | 94.67 |
| train 40% | 96.34 | 90.09 | 85.34 | 94.83 | 92.67 |
| train 50% | 95.83 | 92.71 | 96.88 | 98.18 | 90.63 |
| iPhone 5S | | | | | |
| train 10% | 87.99 | 50.00 | 50.00 | 50.00 | 84.21 |
| train 20% | 50.00 | 50.00 | 90.13 | 89.80 | 50.00 |
| train 30% | 92.85 | 93.57 | 91.91 | 90.71 | 50.00 |
| train 40% | 94.17 | 50.00 | 91.13 | 92.89 | 93.97 |
| train 50% | 94.27 | 88.54 | 88.54 | 95.57 | 94.01 |

Highest classification accuracy results in terms of our Level 2 classification task, i.e. indoors vs. outdoors data for each phone used.

| Phone Type | iPhone 5S | Samsung S5 | Nokia 1020 | Samsung S4 Zoom |
|---|---|---|---|---|
| | 95.57 | 97.13 | 97.91 | 98.17 |

FIG. 11

Classification results from CNN: Close (1m) vs. Far (10m) distance.

| Datasets | set 1 | set 2 | set 3 | set 4 | set 5 |
|---|---|---|---|---|---|
| Samsung S4 Zoom | | | | | |
| Indoor | 97.87 | 97.66 | 95.21 | 92.55 | 93.48 |
| Outdoor | 95.56 | 97.82 | 95.65 | 100 | 90.24 |
| iPhone 5S | | | | | |
| Indoor | 93.75 | 97.83 | 92.86 | 89.36 | 91.35 |
| Outdoor | 71.73 | 93.25 | 44.78 | 40.22 | 54.54 |
| Nokia 1020 | | | | | |
| Indoor | 100 | 93.48 | 97.78 | 97.73 | 95.35 |
| Outdoor | 97.87 | 95.65 | 91.67 | 97.92 | 89.13 |
| Samsung S5 | | | | | |
| Indoor | 97.87 | 94.62 | 95.38 | 91.67 | 95.56 |
| Outdoor | 96.06 | 49.73 | 95.83 | 51.16 | 97.72 |

FIG. 12

(a) Indoor Class: Close vs. Far Distance (b) Outdoor Class: Close vs. Far Distance Best classification results from CNN: Close (1m) vs. Far (10m) distance.

| Phone Type | iPhone 5S | Samsung S5 | Nokia 1020 | Samsung S4 Zoom |
|---|---|---|---|---|
| Scenario 1: With Raw Database | | | | |
| Indoor | 97.83 | 97.87 | 100 | 97.87 |
| Outdoor | 93.25 | 97.72 | 97.92 | 100 |
| Scenario 2: With Detected Face Database | | | | |
| Indoor | 95.23 | 91.12 | 98.40 | 92.02 |
| Outdoor | 89.20 | 92.83 | 93.08 | 91.01 |

FIG. 14

| Rank-1 Score for - All Data Without Grouping | | | |
|---|---|---|---|
| LBP | 0.53 | | |
| VGG-Face | 0.52 | | |
| Rank 1 Scores using LBP - With Grouping using Proposed CNN | | | |
| Level 1 Labeled Class: Cell Type | | | |
| Phone Type | iPhone 5S | Samsung S5 | Nokia 1020 | Samsung S4 Zoom |
| | 0.47 | 0.49 | 0.50 | 0.66 |
| Leve 2 Labeled Class: Indoors or Outdoors | | | |
| Indoor | 0.65 | 0.65 | 0.65 | 0.82 |
| Outdoor | 0.29 | 0.32 | 0.33 | 0.49 |
| Leve 3 Labeled Class: Close or Far Distance | | | |
| Indoor Close | 0.95 | 0.95 | 0.98 | 0.95 |
| Indoor Far | 0.34 | 0.38 | 0.31 | 0.71 |
| Outdoor Close | 0.44 | 0.51 | 0.42 | 0.52 |
| Outdoor Far | 0.15 | 0.23 | 0.17 | 0.46 |

FIG. 15

Impact on Face Matching Accuracy when either of Data Grouping or databased Pre-Screening is used

| Rank | Rank 1 | Rank 2 | Rank 3 | Rank 4 | Rank 5 |
|---|---|---|---|---|---|
| Face Matching - Without Grouping | | | | | |
| LBP | 0.53 | 0.61 | 0.66 | 0.70 | 0.73 |
| VGG-Face | 0.52 | 0.59 | 0.63 | 0.66 | 0.68 |
| Face Matching - With Grouping (Level 1) | | | | | |
| LBP | 0.65 | 0.74 | 0.78 | 0.80 | 0.82 |
| VGG-Face | 0.68 | 0.74 | 0.78 | 0.80 | 0.83 |

Classification results for extended database (100 subjects) from CNN for all the phones: Indoor vs. Outdoor.

| Phone Type | iPhone 5S | Samsung S5 | Nokia 1020 | Samsung S4 Zoom |
|---|---|---|---|---|
| CNN-1 | 90.66 | 90.23 | 90.00 | 93 |
| CNN-2 | 95.23 | 95.33 | 96.33 | 97 |

Face Matching Results for extended database (100 subjects) using LBP matcher for with and without grouping of data.

| Rank-1 Score - All Data Without Grouping for 1 meters | | | | | |
|---|---|---|---|---|---|
| Rank | Rank 1 | Rank 2 | Rank 3 | Rank 4 | Rank 5 |
| LBP | 0.80 | 0.83 | 0.85 | 0.85 | 0.86 |
| VGG-Face | 0.82 | 0.83 | 0.84 | 0.85 | 0.86 |
| LBP Matcher for Database With Grouping | | | | | |
| Level 2 Labeled Class: Indoors or Outdoors | | | | | |
| Phone Rank 1 | | iPhone 5S | Samsung S5 | Nokia 1020 | Samsung S4 Zoom |
| Indoor | | 0.99 | 1.00 | 0.99 | 1.00 |
| Outdoor | | 0.57 | 0.46 | 0.56 | 0.58 |

FIG. 18

HIGH ACCURACY AND VOLUME FACIAL RECOGNITION ON MOBILE PLATFORMS

CROSS-REFERENCE TO RELATED APPLICATIONS

This Application claims the benefit of U.S. Provisional Application No. 62/653,156, filed on Apr. 5, 2018, which is incorporated herein by reference in its entirety.

STATEMENT REGARDING FEDERALLY SPONSORED RESEARCH OR DEVELOPMENT

This invention was made with government support under grant number is DHS-14-ST-061-COE-00 awarded by the Department of Homeland Security. The Government has certain rights in the invention.

BACKGROUND

Face recognition is a biometric application in which an individual face is identified in a digital image by analyzing and comparing patterns. There are usually three steps in a face recognition system: acquisition, normalization, and recognition. Acquisition is the recognition and capture of facial descriptions. Normalization refers to segmentation, arrangement, and consistency of facial descriptions. Recognition includes illustration, modeling of unfamiliar facial descriptions, and linking the models with well-known models to offer the identities.

Face recognition has grown as a major study area, specifically in the areas of computer visualization and applied pattern recognition. The first semi-automated face recognition systems were developed in the 1960s. Although significant progress has been made, state-of-the-art face recognition systems degrade significantly when confronted with real-world scenarios. Some limitations include illumination, pose, facial expression changes, and facial disguise. Facial recognition has also become a prominent aspect of personal phones and computers, as well as social media platforms.

Facial recognition has shown vast improvements in terms of increase accuracy under favorable conditions, when collected with high quality image sensors and optics. However, facial recognition is currently unreliable when conducted with facial images collected in the wild from low quality cameras (e.g., cellphones) in variable conditions, including changes in lighting, background, distance from the camera, and many other challenging scenarios.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 is a table depicting the highest classification accuracy results in terms of a level two classification task, in accordance to various embodiments of the present disclosure.

FIG. 12 is a table depicting classification results in terms of standoff distances, in accordance to various embodiments of the present disclosure.

FIG. 14 is a table depicting classification results in terms of standoff distances, in accordance to various embodiments of the present disclosure.

FIG. 15 is a table depicting face matching or with or without grouping of data, in accordance to various embodiments of the present disclosure.

FIG. 16 is a table depicting the impact of face matching accuracy when either of data grouping or databased prescreening is used, in accordance to various embodiments of the present disclosure.

FIG. 17 is a table depicting classification results for an extended database from CNN, in accordance to various embodiments of the present disclosure.

FIG. 18 is a table depicting face matching results for the extended database using LBP matcher for with and without grouping of data, in accordance to various embodiments of the present disclosure.

DETAILED DESCRIPTION

Figure 1A:
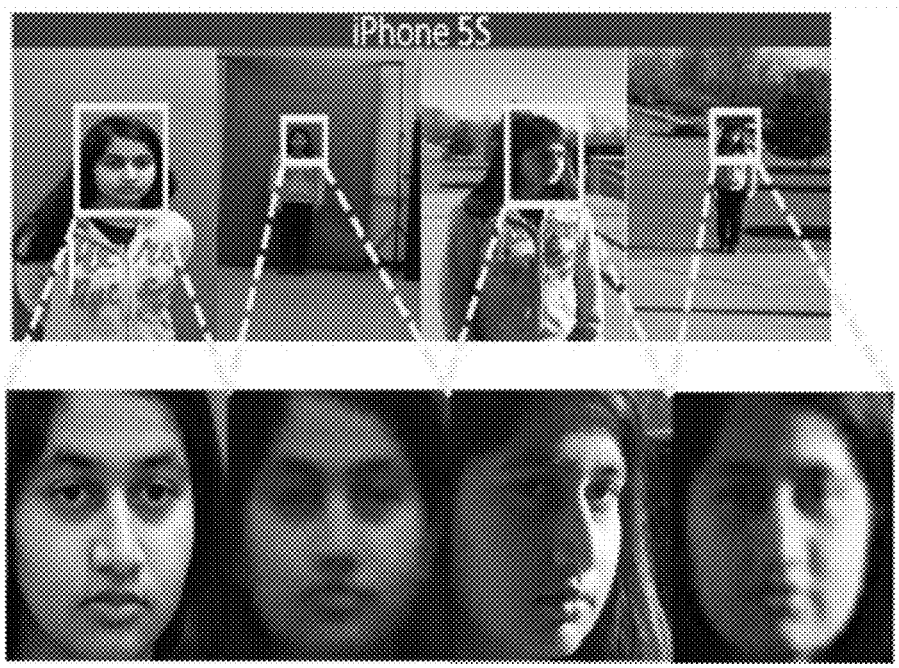
FIGS. 1A-1D are example images within a multi-sensor face image database collected using various mobile devices in accordance with various embodiments of the present disclosure.

Disclosed herein are various embodiments related to facial recognition on mobile platforms. Specifically, the various embodiments of the present disclosure relate to a convolutional neural network, scenario-dependent, and sensor-adaptable algorithm approach for the classification of data in terms of phone type, conditions, and standoff distances before face recognition algorithms are used. There are three major aspects to the disclosure. First, a mobile application is configured to facilitate the capture of an image and the transmission of this image to a server where the image is received and decoded to be ready for further processing. Next, automated face detection and recognition techniques can be used to compute image facial features that show a very high distinction between human identities. To cope with pose variations, facial images are classified into a frontal or a non-frontal class. Finally, these facial features are combined with data flow methods designed to facilitate a high volume of comparisons to quickly determine the closest human identity to the query image. These results are then returned to the mobile application and displayed to the user.

Traditional face recognition algorithms utilize holistic features and local feature approaches. Local appearance features have certain advantages over holistic features. These methods are more stable to local changes such as expression, occlusion, and misalignment. Specifically, neural network based classification is a non-linear holistic face recognition solution. The systems and methods of the present disclosure utilize a convolutional neural network to classify data in terms of phone type, conditions, and standoff distances. The system allows for high volume and accuracy facial recognition on mobile platforms, giving the user near instant feedback on a subject's identity. The systems and methods of the present disclosure can match a single probe image to about 400,000 gallery images in under 0.1 (or 0.001 depending on the recognition accuracy trade-off) seconds (hardware dependent approach).

Face recognition using three-dimensional (3D) models has received increasing attention in biometrics. The advantage behind using 3D data is that depth information does not depend on pose and illumination, making the whole system more robust. On the other side, the drawback of using 3D data is that these face recognition approaches need all the elements of the system to be well calibrated and synchronized to acquire accurate 3D data (texture and depth maps). Moreover, the existing 3D face recognition approaches rely on a surface registration or on complex feature (surface descriptor) extraction and matching techniques. As a result, they are computationally expensive and not suitable for practical applications. Moreover, they require the cooperation of the subject making them not useful for uncontrolled or semi-controlled scenarios where the only input of the algorithms will be a (two-dimensional) 2D intensity image acquired from a single camera. Meanwhile, the use of video for face recognition is a promising but relatively less explored solution. An immediate advantage in using video information is the possibility of employing redundancy present in the video sequence to improve still image systems.

The present disclosure relates to a convolutional neural network (CNN) based, scenario-dependent and sensor (mobile device) adaptable hierarchical classification framework. The systems and methods of the present disclosure can automatically categorize face data captured under various challenging conditions, before the facial recognition (FR) algorithms (e.g., pre-processing, feature extraction and matching) are used. First, a unique multi-sensor database is collected containing face images indoors, outdoors, with yaw angle from $-90°$ to $+90°$ and at two different distances (e.g., 1 and 10 meters). In this one non-limiting example, the unique multi-sensor data was collected from mobile phone devices including Samsung S4 Zoom, Nokia 1020, iPhone 5S, and Samsung S5 phones. To cope with pose variations, face detection and pose estimation algorithms are used for classifying the facial images into a frontal or a non-frontal class.

Next, tri-level hierarchical classification is performed as follows: Level 1, face images are classified based on phone type; Level 2, face images are further classified into indoor and outdoor images; and finally, Level 3 face images are classified into a close (e.g., 1 m) and a far, low quality, (e.g., 10 m) distance categories, respectively. Experimental results show that classification accuracy is scenario dependent, reaching from about 95 to more than 98% accuracy for level 2 and from 90 to more than 99% for level 3 classification. A set of performed experiments indicate that, the usage of data grouping before the face matching is performed, resulted in a significantly improved rank-1 identification rate when compared to the original (all vs. all) biometric system.

Standard face recognition (FR) systems typically result in very high identification rates, when the face images are taken under highly controlled conditions (e.g., indoors, during day time, at short range, etc.). However, in law enforcement and security applications, investigators deal with mixed FR scenarios that involve matching probe face images captured by different portable devices (cell phones, tablets, etc.), and at a variable distances against good quality face images (e.g., mug shots) acquired using high definition camera sensors (e.g., DSLR cameras).

The worldwide popularity of mobile devices, due to rapid increase in processing power, sensor size and storage capacity offers a unique collection of mobile databases for studying more challenging FR scenarios. Most modern smartphones contain both rear and front facing cameras capable to capture both images and videos. Online statistics from 2016 depicted that the total number of smartphone users have reached 2.08 billion within 2016. Mobile based face identification systems are used by law enforcement agencies for security purposes. The major challenges for mobile based FR are variation in illumination conditions, poor face image quality (due to various factors including noise and blurriness due to movement of hand-held device during collection), variations in face pose and camera sensor quality. These factors can degrade the overall performance of FR systems (including pre-processing, face detection, eye detection and face matching). To facilitate recognition performance, knowing the specific image category (e.g., phone type, indoors, outdoors, distance of the subject from the camera based on origin) is important in order to set the proper parameters for image quality prediction, as well as face and eye detection.

Predicting this image category is a task that humans can perform easily. However, such a process is time consuming, especially, when dealing with large scale face datasets. Therefore, an automatic process of classifying images into a specific scenarios is needed. A lot of early work in the area of image based data grouping is based on the usage of low level features to classify scenes into indoors and outdoors categories. One known method includes an (visible band) image classification that depends on using low level features extraction and processing. In this method, images are classified into indoor or outdoor. Then, outdoor images are further classified as city or landscape categories and, finally, landscape images are classified into a forest, sunset or mountain categories. Recently, deep convolutional neural networks have achieved great success in the area of computer vision, machine vision, image processing and biometrics for the classification of scenes, object recognition, detection, face authentication and quality assessment.

Some known examples include a probabilistic neural network (PNN) based approach for the classification of indoor vs. outdoor visible band images. One known example includes a deep feature based face detector for mobile devices using front-facing cameras. This known method was applied on the database collected under varying illumination conditions, poses and partial faces. This deep feature method outperformed the traditional methods and the developed system can be implemented for offline systems.

The use of deep convolutional neural networks (CNNs) has also been extended for face recognition applications. In one known example, face images from online search engines were collected and a VGG-16 network was trained to extract deep face features that can be used for face recognition. This approach achieved high face recognition and verification accuracy in a variety of scenarios. Most of the existing classification systems are based on image scene classification into indoors or outdoors and result in operationally acceptable classification rates. The present disclosure presents a solution to a more complicated problem. The methods and systems of the present disclosure relate to a multi-sensor cell phone face database captured at variable standoff distances, illumination conditions, and pose angles. The present disclosure provides a deep learning based, scenario-dependent, and sensor-adaptable algorithmic approach for the classification of data in terms of phone type, conditions, and standoff distances. To show the impact of classification or database pre-screening, face matching experiments are performed using local binary patterns (LBP) and the VGG Face matcher with data grouping using the classification approach of the present disclosure, or without data grouping, i,e, using the original face database to apply a set of FR matchers.

There are various studies where face images captured from different devices are matched against visible good quality face images. However, there is no study reported where all face datasets available are simultaneously collected (i) using variable portable devices that have the capability (sensors) to acquire mid-range (e.g., >10 meters) face images, (ii) at different standoff distances, and (iii) at indoors vs. outdoors conditions.

Figure 1B:
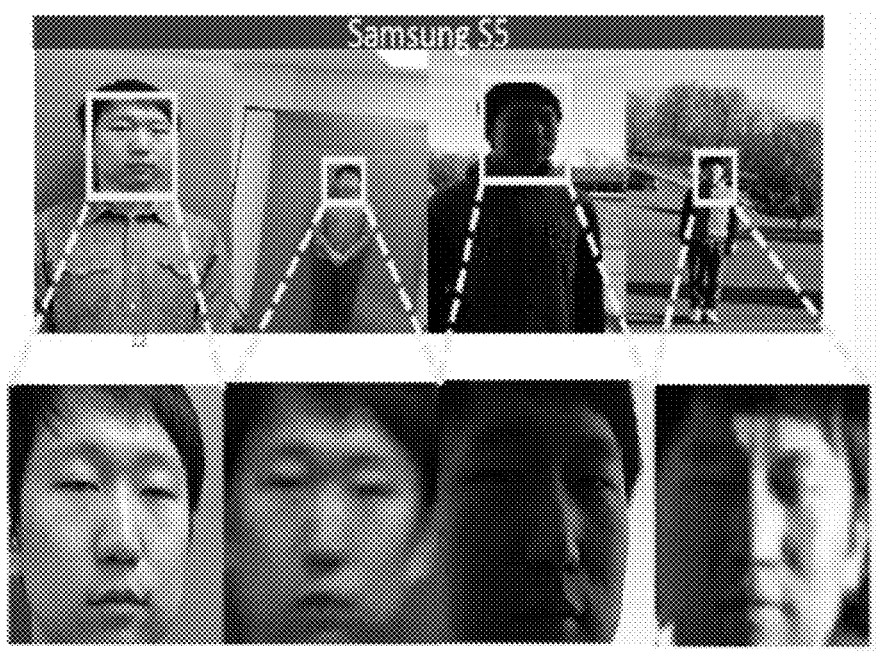
Figure 1C:
Figure 1D:
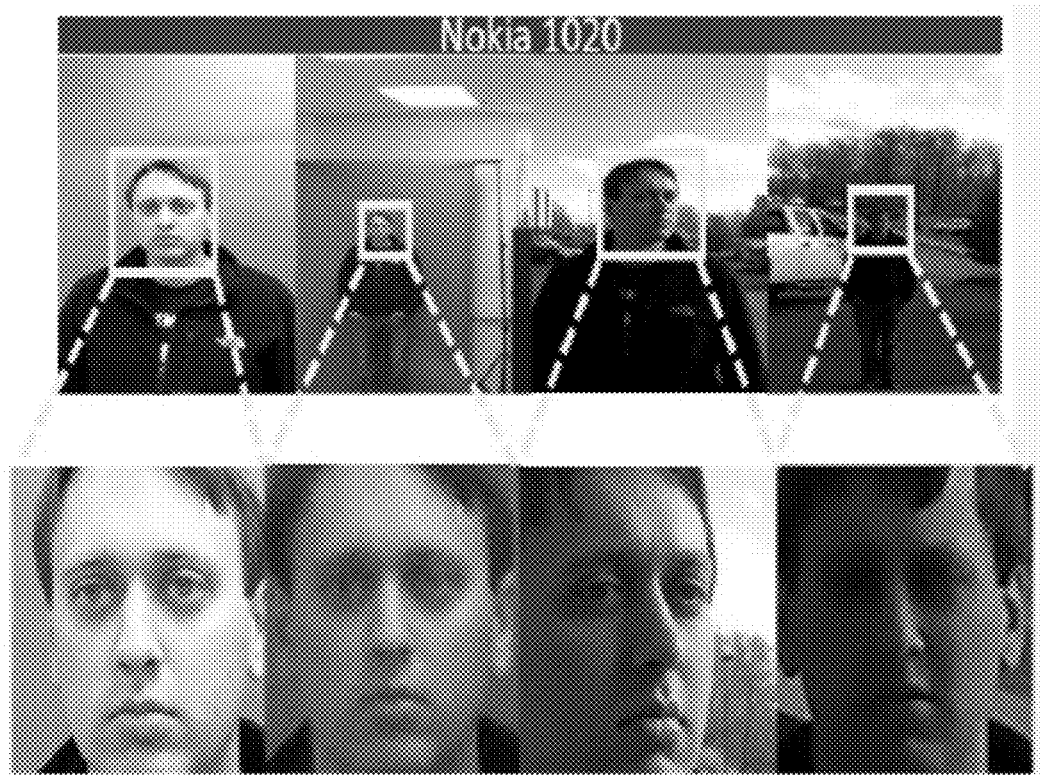
Figure 2:
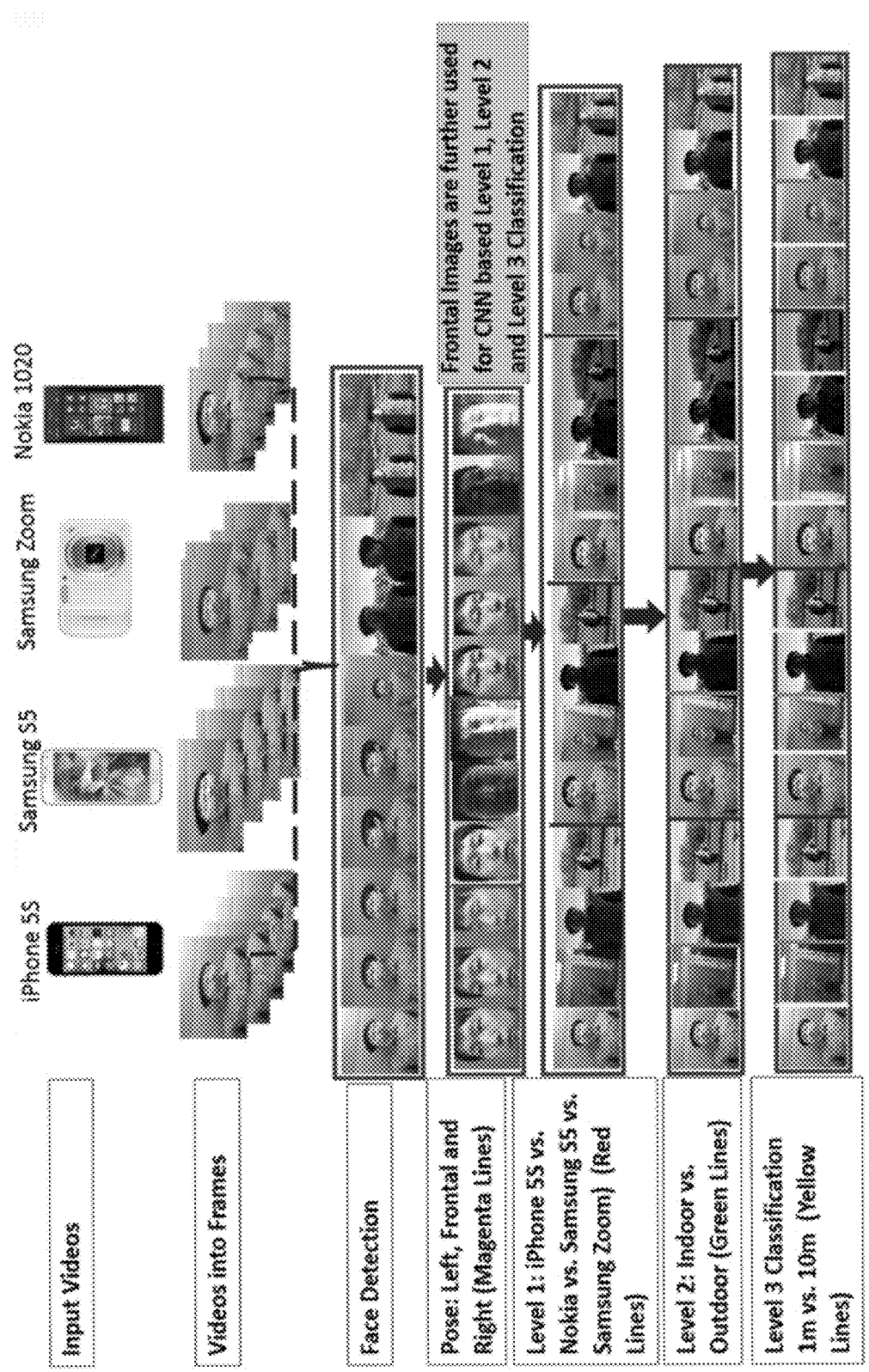
FIG. 2 is an example image of a hierarchical classification using face images captured from mobile phones, in accordance with various embodiments of the present disclosure.

According to various embodiments of the present disclosure, a multi-sensor (MS) face image database can include images collected using multiple mobile devices. The database discussed in the experiments of the present disclosure include images collected from the Samsung S4 Zoom, the Nokia 1020, the Samsung S5 and the iPhone 5S. The database includes images collected indoors, outdoors, at standoff distances of 1 m and 10 m respectively, and with different pose angles. FIGS. 1A-1D illustrate examples of images included in the multi-sensor face image database that are collected using various mobile devices under challenging conditions (e.g., indoor, outdoor, different standoff distances, different pose angles, etc.). According to various embodiments, an automated face detection and pose estimation method is designed and developed to select full-frontal face images that will be used to perform the hierarchical classification experiments. The hierarchical classification framework of the present disclosure is composed of three levels of operation: at the top level (Level 1), images are classified into mobile device types, which are then further classified as indoor or outdoor face images (Level 2); finally, indoor and outdoor face images are classified as either close or far standoff distance images (Level 3). The complete proposed framework is represented in FIG. 2.

Methodology

The following relates to the challenging database collected and the CNN architecture used to perform grouping on data based on a three level classification scheme, in accordance to various embodiments of the present disclosure.

A. Database

A multi-sensor visible database (DB1) was collected to perform the classification experiments using four phones. Face videos were collected indoors, outdoors, at a standoff distance of 1 m and 10 m as shown in FIGS. 1A-1D. In total, the database consists of 50 subjects. For each subject, 16 videos are collected, including 4 videos (2 videos: indoors 1 m and 10 m and 2 videos: outdoors 1 m and 10 m) from each phone. Each video consists of around 700 frames and in total almost 11,200 frames for a single subject. Each video is captured with head poses varying from −90° to +90°. Two scenarios are selected to collect the database.

Close Distance (~1 m): Involves both the face and shoulder part of the body.

Far Distance (~10 m): Involves full body images. Please check in FIGS. 1A-1D for sample images of the database collected for the aforementioned scenarios. FIG. 1A represents video frames collected from an iPhone 5S and FIG. 1C represents the video frames collected from a Samsung S4 Zoom (equipped with 10× optical zoom to capture close-ups from far distances). FIG. 1B represents the video frames captured from a Samsung S5 and FIG. 1D represents the video frames from a Nokia 1020. A multi-sensor database (DB2) collected from 92 subjects under un-constrained conditions including, outdoors, at standoff distances of 2.5 to 10 meters for Nokia, Samsung S5 and iPhone 5S and 25 to 80 meters for Samsung S4 Zoom is used to train the CNN network.

B. Classification of Frontal Vs. Non-Frontal Face Images

Figure 3:
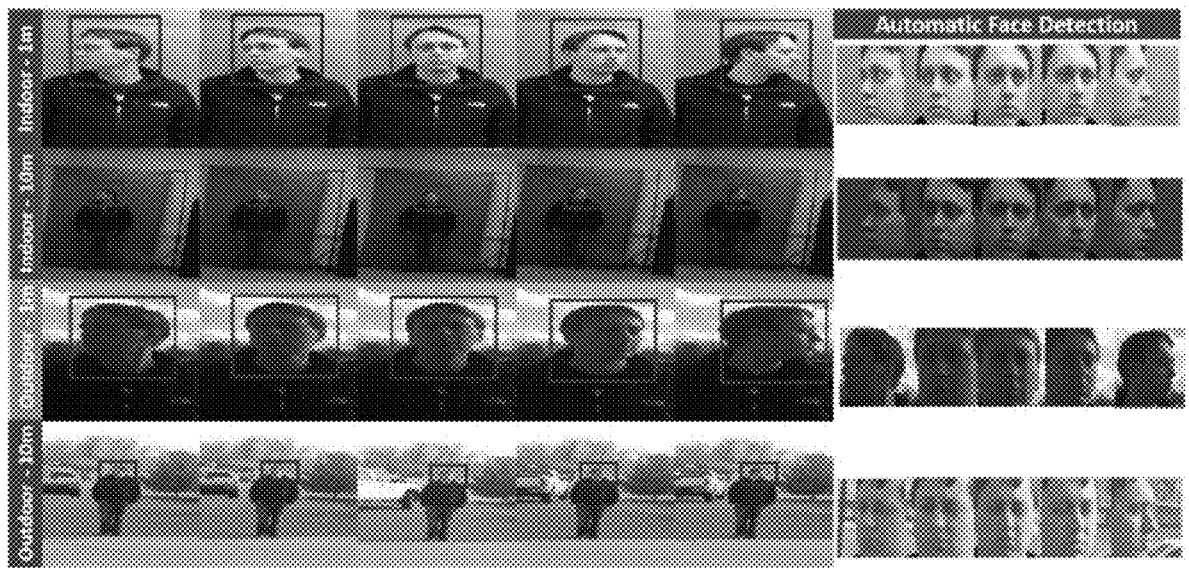
FIG. 3 is an example image illustrating face detection on face images captured from a mobile device under unconstrained conditions, in accordance with various embodiments of the present disclosure.
Figure 4:
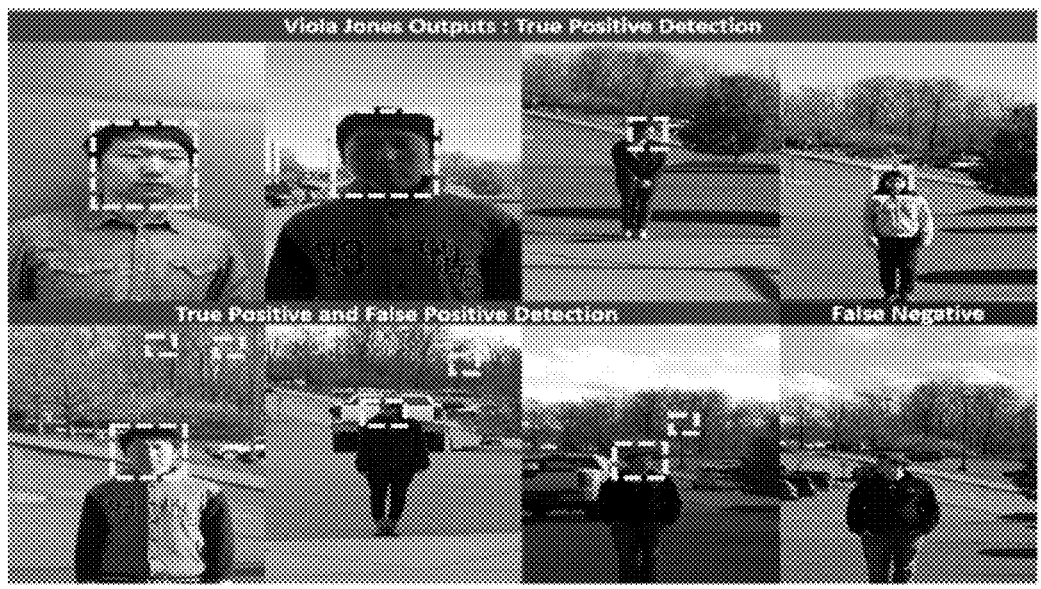
FIG. 4 is an example image of results from a face detector showing true positives, false positives, and false negatives, in accordance to various embodiments of the present disclosure.

Face recognition and image classification systems perform well when good quality full-frontal face images are used. The data used in the disclosed experiments is very challenging. In order to keep only full-frontal face images to perform the other pre-processing and face matching experiments, an automated face detection and pose estimation method is selected. Finally, the frontal vs. non-frontal face classification (for all the phones, indoors, outdoors, at close and far distance) is performed based on the automatically estimated pose angle. In experiments, good results for the face images collected at close indoors and outdoors distances were achieved. FIG. 3 illustrates examples of the face detection on face images captured from mobile phones under un-constrained conditions. The main challenge was to detect the face for the images collected outdoors, at far distances, with challenging pose angles and for the camera phones with no optical zoom in capabilities. For some cases, there was no output or multiple outputs with various false positives and false negatives rates as shown in FIG. 4.

Face Detection: According to various embodiments, a cascaded adaboost classifier was used for face detection and the algorithm was adapted for the collected images in the challenging multi-sensor mobile device face database. To address the issue, for the output with multiple images, the bounding boxes are found and then the condition to search for a face bounding box is applied based on the size of box and the pixel location.

Pose Estimation: There are three types of face pose rotation angles such as yaw, pitch and rolling angle. The algorithm discussed in Aghajanian, et al., (J. Aghajanian and S. Prince, "Face Pose Estimation in Uncontrolled Environments", Proceedings of the British Machine Vision Conference, BMVC, vol. 1, September, 2008, pp 1-11, is used to estimate the face pose, for the database collected under un-controlled conditions. This algorithm classifies the detected face images into three categories left profile, frontal and right profile, with yaw angle from −90° to 90°.

Figure 5:
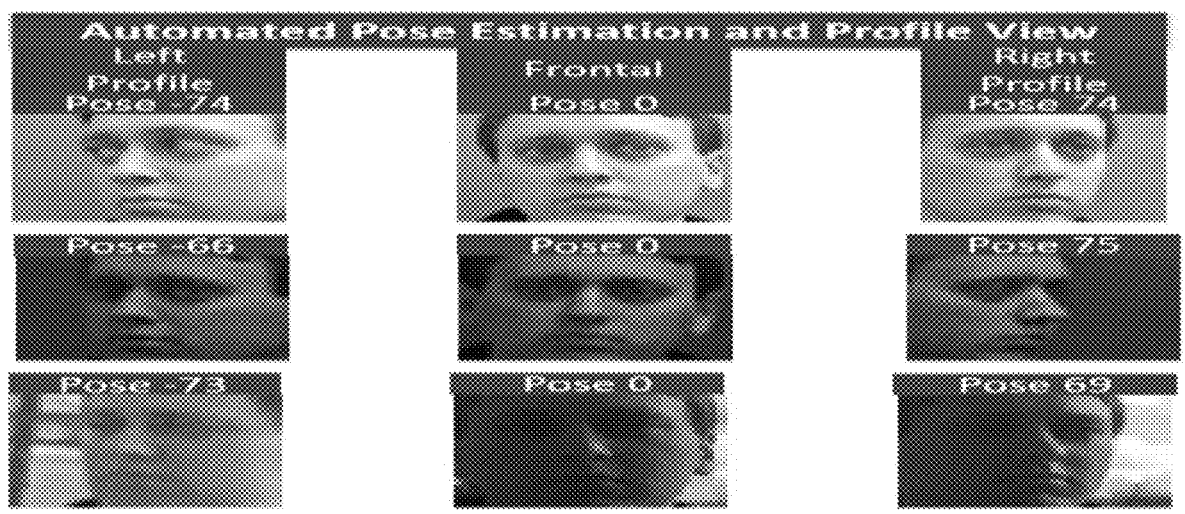
FIG. 5 is a diagram illustrating pose estimation for detected face images, in accordance to various embodiments of the present disclosure.

According to various embodiments, a probabilistic framework is generated, where the subjects' faces are represented by non-overlapping grid of patches and a generative model, based on this patch representation, is further used for pose estimation on test images. To perform the pose estimation experiments, the radial bias functions (RBF) with size of RBF9D, patch grid resolution of 10_10, number of patches of 100, and a standard deviation (for RBF) of 45 were selected. As shown in FIG. 5, good results for the database collected from sensors with large size face images (when using Samsung S4 Zoom and Nokia 1020). It was more challenging to process face images of smaller spatial resolution (when using the iPhone, Samsung S5). For the outdoor data at far distances, some of the faces are misclassified with a wrong pose angles. The face images with frontal view and yaw angle of 0° are classified as frontal and face images with left and right profile are classified as nonfrontal (yaw angle less than and greater than 0°).

C. Convolutional Neural Network

Figure 6:
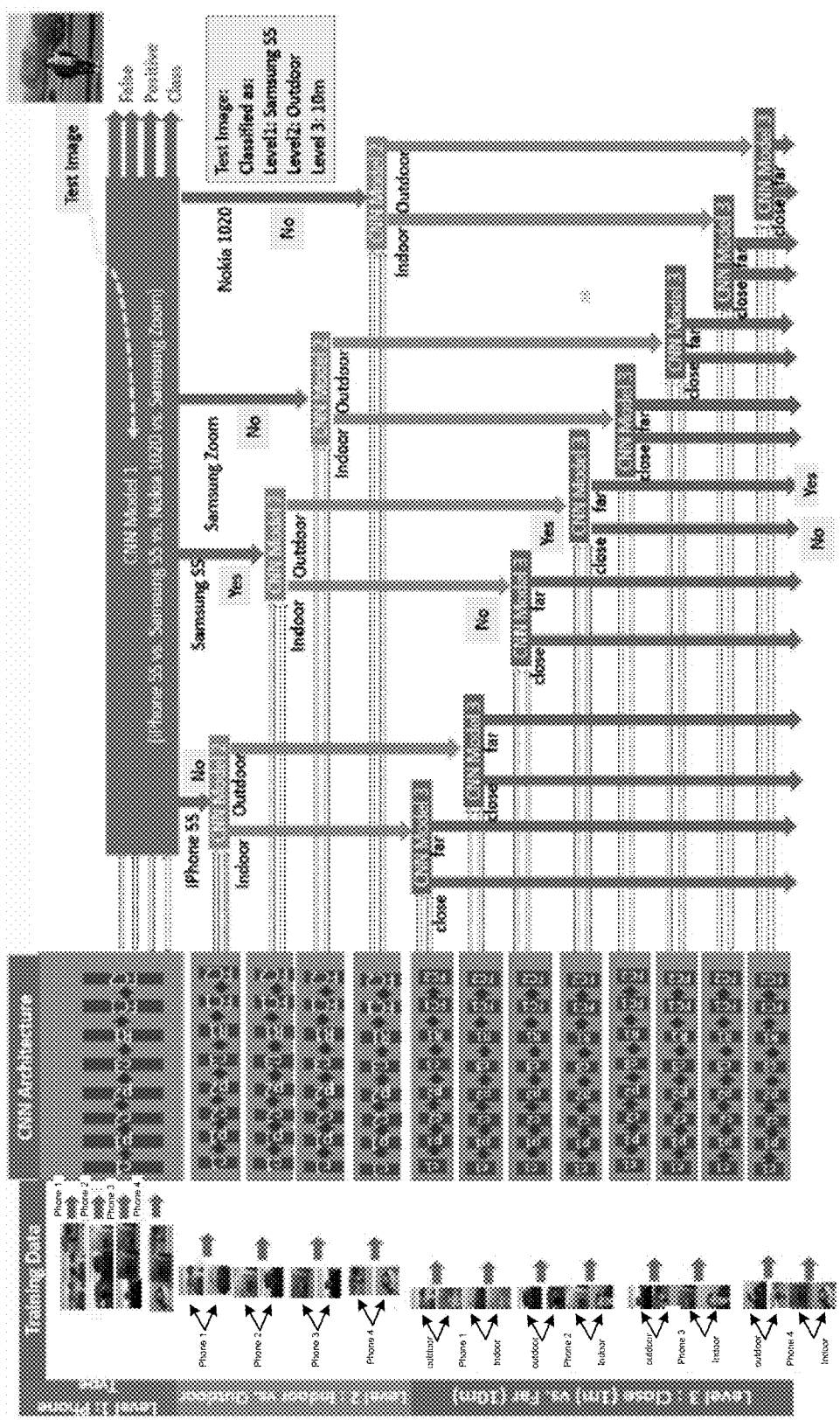
FIG. 6 is a diagram illustrating a convoluted neural network (CNN) scheme to perform the hierarchical classification, in accordance to various embodiments of the present disclosure.

According to various embodiments, a scenario dependent and sensor adaptive CNN network is capable of classifying images with class label of phone type, illumination condition and standoff distance (see in FIG. 6). The lower layer features are favorable for landmark location and pose estimation. Whereas, the higher layer features are best fit to perform the classification task. The present disclosure is focused on higher layer features to perform the hierarchical classification. To generate the model, the visual geometry group (VGG) CNN architecture is selected. The network consists of convolutional layers (a bank of linear filters), followed by a rectification layer such as rectified linear unit (ReLU) and max pooling layer, along with fully connected layers.

Model Architecture: The architecture of the present disclosure comprises 8 layers including: 3 convolutional layers followed by 2 pooling layers, 1 rectified layer and 2 fully connected layers (see in FIG. 6). The convolutional layers output the feature maps, where each element is computed by a dot product between the local region and the selected set of filters. The pooling layer is applied to perform the down-sampling operation via computing the maximum of local region. The last fully connected layer is softmax that computes the scores for each class.

The first convolutional layer of the network has twenty (20) operational filters of size 5×5 followed by max pooling layer which takes the maximum value of 2×2 regions with two (2) strides. The output of the previous layer is processed by the second convolutional layer, which consists of twenty (20) filters with size of 5×5 filters followed by a max pooling layer. The output of the previous layer is processed by a third convolutional layer, which consists of fifty (50) filters with a 4×4 filter size, followed by a rectified layer. The output of the third convolutional layer is processed through the fully connected layer and finally, the output is fed to a softmax layer that assigns a label to each class. For level 1 classification, the last softmax layer assigns a label in terms of the of phone type, iPhone 5S, Samsung S5, Samsung S4 Zoom and Nokia 1020. For the level 2 classification, the last softmax layer assigns either an indoor or outdoor label.

Finally, for level 3 classification, softmax assigns a label to each input face as a close or far distance face image (see in FIG. 6).

Training and Testing: In this experiment, a large scale training database from available image repositories was not collected due to limited resources. In addition, labeling a large scale database manually would be a very time consuming process. Also, there was no pre-trained multi-sensor network models available to use for the CNN network of the present disclosure. Thus, models were trained on the original database for each level, i.e. from level 1 to level 3. To train the system for each level, the following factors were used: a fixed value of 0.92 for the momentum parameter, a batch size of 100 and a learning rate of 0.002. The classification framework is performed for 13 different set of epoch values, namely 4, 8, 12, 16, . . . 52, i.e. for each level of the classification ranging from level 1 to level 3. The classification results are represented in the experimental results section.

Level 1: The input face database comprises images collected under variation in illumination conditions, standoff distances, sensor type, ethnicity and gender. To train the system, four labeled classes in terms of the mobile device type are used to train the system. The network is trained to classify each of the test images into the right phone type face image (e.g., face images collected using an iPhone, are categorized into the iPhone face folder).

Level 2: The level 2 classifier was trained using both indoor and outdoor face images for each mobile device. Thus, the original face data categorized into a phone type face folder (Level 1), are now further categorized into either an indoor or outdoor category.

Level 3: The level 3 classifier was trained using 1 m and 10 m face images for indoor and outdoor class face images captured from any phone used in our data collection process. Thus, the data used for the training the level 2 classifier are now further classified into either an 1 m or 10 m distance category. Although 1 m and 10 m are used in this non-limiting example, the level 3 classifier can be trained using any other distances, as can be appreciated.

D. Face Matching

Local Binary Patterns: LBP matcher is used to extract the appearance and texture information from human faces and is invariant to changes in illumination conditions.

VGG Face Network: Although the VGG-Face network is trained on a specific set of identities, the features extracted in intermediate layers can be applied to other identities for recognition. To evaluate the dataset, the features extracted in the last fully connected layer before the softmax as deep facial features were compared using the Euclidean distance to generate a distance score between two face images.

Experimental Results

The first set of experiments illustrate how the mobile phone adaptable deep learning system performs for Level 1 classification, where the multi-sensor data collected under un-controlled conditions is used to classify phone types. For Level 2 classification, a set of experiments is performed, where for each phone type the face images are further classified into an indoor or outdoor class. For Level 3 classification, both indoor and outdoor face images are further classified into close (1 m) or far (10 m) distance face images (see FIG. 2).

A. Level 1: CNN based Phone Type Classification

Figures 7, 8:
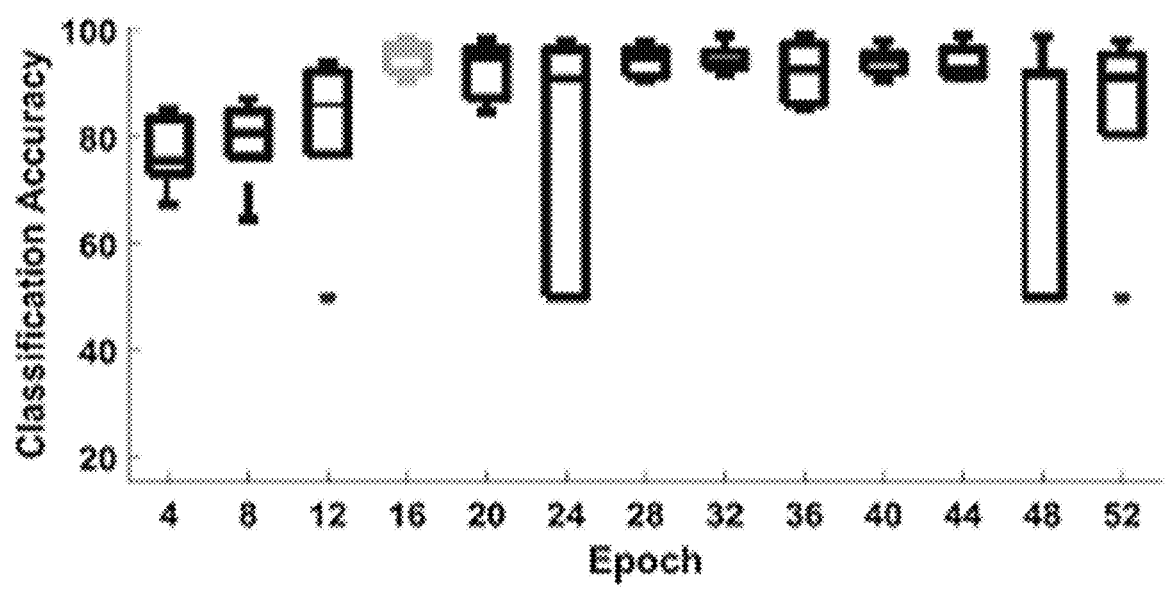
FIG. 7 is a table depicting accuracy results for the grouping of data in terms of phone types using the CNN scheme, in accordance to various embodiments of the present disclosure.
FIG. 8. illustrates an example of a graph depicting classification accuracy with respect to Epoch following a set of five experiments, in accordance to various embodiments of the present disclosure.

In this experiment, CNN network is proposed for the grouping of the database into four classes with labels iPhone 5S, Samsung S4 Zoom, Nokia 1020 and Samsung S5. To train the CNN network, three scenarios are selected including, Scenario 1, the subjects in the training and test sets are different, and the images are taken at different locations and days. The database DB2 (collected outdoors at standoff distance from 2.5 to 80 meters away) is used for the training and DB1 for testing. For Scenario 2, DB1 was selected for training (50%) and the rest of the database for testing without any overlap of subjects. For Scenario 3, the images collected from both DB1 (50%) and DB2 (All Data) are used for training, while the DB1 for testing. There is no overlap of subjects in the training and test sets. Note that the expected accuracy would be much higher if 90% of the data was used for training (10-fold cross validation). Due to time constraint this was not possible. The table of FIG. 7 depicts the accuracy results for the grouping of data in terms of phone types from CNN used. Based on the results, the classification results of highest accuracy was achieved from scenario 3 and, the classification accuracy reaches almost 75%.

B. Level 2: CNN based Conditional Classification

The output face images of the Level 1 classification task, were further classified into indoor and outdoor face images. To train the CNN network, the data was divided into different set sizes (10% 20%, 30%, 40% and 50%) for training, while the rest of the data was used for testing. In order to examine the effectiveness of the classification system, this process was repeated five times, where each time a different training set was randomly selected and rest of the data was used for testing (without overlap of subjects). Classification was performed for thirteen different set of epoch values, namely 4, 8, 12, . . . 52 for each phone and, finally, selected the value where the best classification results were achieved from all five sets. The results for Samsung S4 Zoom are shown in FIG. 8, where the highest classification accuracy was achieved. The setting for these results was when the epoch value was set to 16 and 50% of the data was used for training. The same set of experiments were performed for rest of the remaining three phones.

Figures 9, 10:
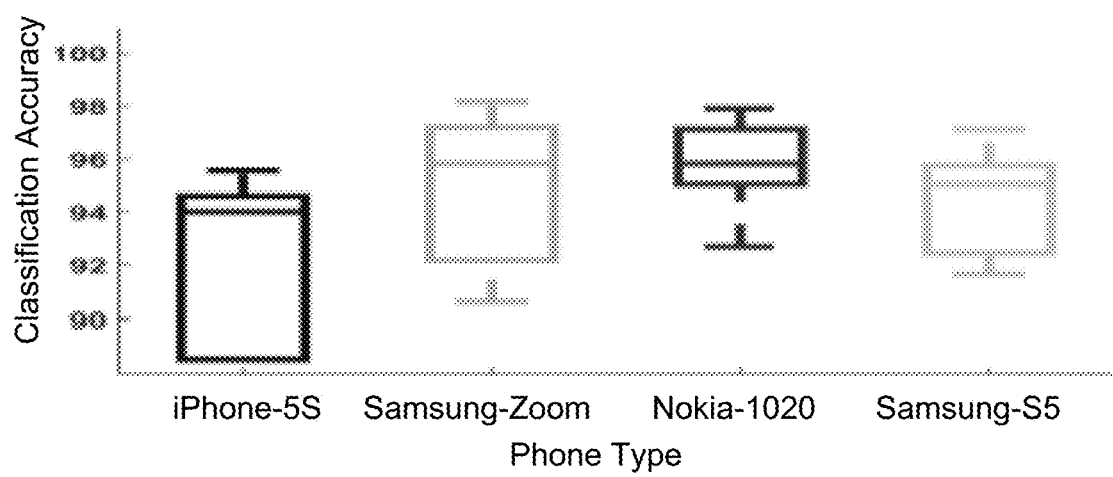
FIG. 9 is a table depicting classification results from the CNN scheme for indoor versus outdoor, in accordance to various embodiments of the present disclosure.
FIG. 10 illustrates an example of a graph depicting classification accuracy results with a selected set of epoch and training sets for CNN, in accordance to various embodiments of the present disclosure.

In the table shown in FIG. 9, classification results are presented with the epoch value resulted in the highest accuracy from Samsung S4 Zoom and iPhone 5S. The same set of experiments were repeated for Samsung S5 and Nokia 1020. Based on the results, the classification results of highest accuracy were achieved when 50% of the data was used for training. For Samsung S4 Zoom, Nokia 1020 and Samsung S5, the classification accuracy on average from five sets reaches greater than 93%. For iPhone 5S, the classification accuracy on average reaches more than 91%. In the table of FIG. 11, the classification results of highest accuracy from each phone are represented. Based on mean and variance plots, the classification accuracy reaches approximately 95% when the Nokia 1020 face dataset was used (this was the highest accuracy when compared to any other phone specific face dataset used. See FIG. 10).

C. Level 3: CNN based Standoff Distance Classification

The labeled indoor and outdoor data from Level 2 classification is used to classify into either a close or a far distance class. The classification experiments were performed for thirteen different set of epoch values, namely 4, 8, 12, . . . 52. In the table of FIG. 12, the highest classification accuracy results are presented for each of the Samsung S4 Zoom, iPhone 5S, Nokia 1020 and Samsung S5 face datasets.

Figure 13A:
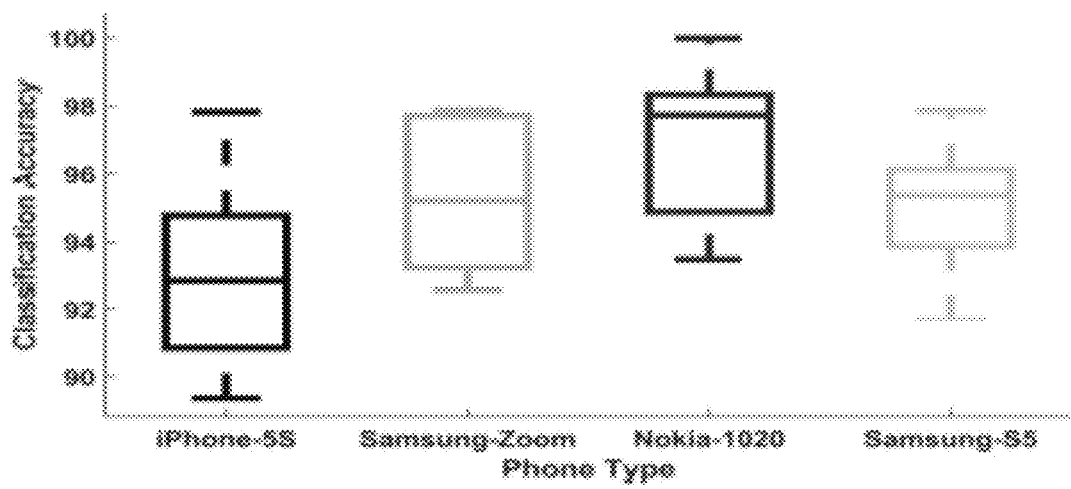
FIGS. 13A and 13B illustrate example graphs depicting classification results for level three classification, in accordance to various embodiments of the present disclosure.
Figure 13B:
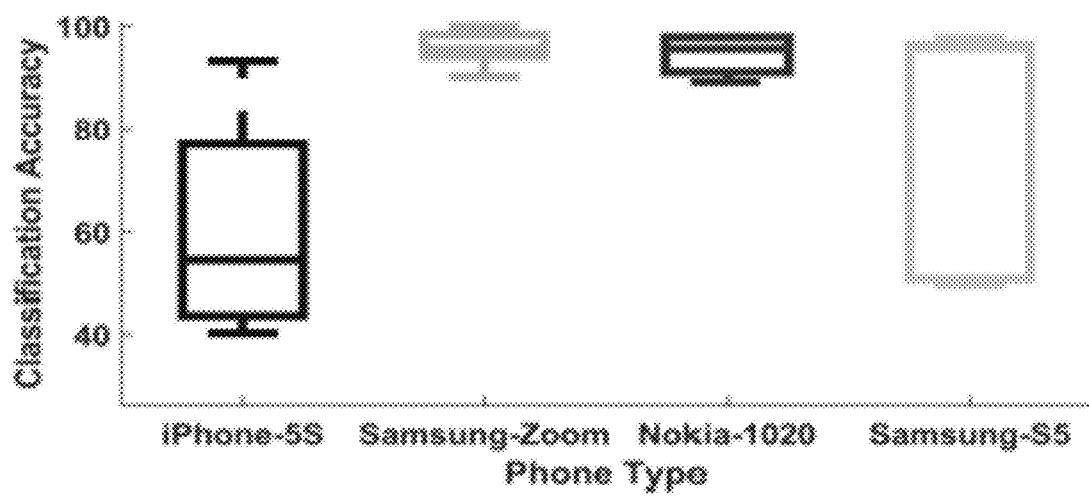

Based on the results, the classification accuracy on average from five sets reaches greater than 94% for both the indoor and outdoor class for the Samsung S4 Zoom. For the iPhone 5S, with the indoor class, the classification accuracy reaches greater than 90% and for the outdoor class, the classification accuracy reaches almost 60%. For the Samsung S5, with the indoor class, the classification accuracy reaches greater than 94% and for the outdoor class, the classification accuracy reaches greater than 75%. Based on mean and variance plots, the highest classification accuracy results for the indoor dataset that was classified into close or far distance was achieved for Nokia 1020. For the same classification problem, when using outdoor dataset, the highest accuracy classification results were achieved when using the Samsung S4 Zoom (see FIGS. 13A and 13B). In the table of FIG. 14, the results are represented based on two scenarios. In scenario 1, the original raw images are selected, and in scenario 2 the detected face images are selected to perform classification using CNN. Based on the results, the overall the highest classification accuracy results were achieved when the original database was selected to perform the classification. For the indoor class, the results are similar. However, for the outdoor class, scenario 1 outperformed scenario 2. A valid reason for the outcome results is that for the outdoor dataset, the images with background have more features to offer to perform the classification while, for the indoor class, the background is uniform.

D. Face Matching Results: With and Without Grouping

First, experiments are performed with the original FR system, namely when no grouping is used. Second, grouped datasets in terms of cell-phone type, indoors or outdoors, close or far distance were used. The identification results using LBP-CHI method are summarized in the table of FIG. 15. Based on the results, the rank-1 score is improved from 53% (All Data) to 66%—Level 1 (Samsung S4 Zoom), 82%—Level 2 (Samsung S4 Zoom Indoor) and to 95%—Level 3 (Indoor Close) and 71% (Indoor Far). The face matching experiments are represented in the table of FIG. 15. To show the impact of grouping or pre-screening of the database on face matching, the first five rank identification rates are shown in the table of FIG. 16.

E. Classification and Matching: With Extended Database

The database size in terms of all scenarios, including cell phone types, indoors, outdoors, with different poses, at short and far distances were doubled and the classification (Level 2) and face matching experiments were repeated. For the classification where 50% of the data is used for training and the rest for testing (without any overlap of subjects), 93% accuracy (Samsung Zoom) was achieved. To further improve the classification results, the model with more layers (CNN-2: 12 layers based on MatConvNet) was selected, and, based on results, the classification reaches to 97% as represented in the table shown in FIG. 17. Based on the face matching results, the rank-1 identification rate is improved from 82%—VGG Face and 80%—LBP (All Data) to more than 98%—Level 2 (All Phones Indoors 1 meters) as represented in the table of FIG. 18.

The performance of the image classification system of the present disclosure is sensitive to face pose variations. To deal with this issue, an algorithmic approach for the selection of frontal face images was generated: first, faces were detected, next a pose estimation algorithm was applied, and, finally, based on the left, right and frontal view, the face images were classified into a frontal or a non-frontal (left and right profile) class. The frontal face image dataset generated was then used to apply the proposed CNN framework for hierarchical classification (Level 1, Level 2 and Level 3). The CNN model was trained using the challenging multisensory mobile phone face database and, for each classification level, a series of tests was performed to select the network parameters that result in high classification accuracy. The experiments showed that for Level 1 classification, the proposed CNN provides significant classification accuracy, i.e. more than 80%. More than 95% classification accuracy was achieved for Level 2 classification in most scenarios tested. More than 96% accuracy was achieved for Level 3 classification for the indoor class into close or far distance. For the outdoor class into close or far distance, more than 90% accuracy was achieved. The face matching results provide important evidence that data grouping in terms of cell-phone type, indoors or outdoors and close or short distance provide significant improvement in the rank-1 identification rate (e.g., the performance is improved from 53% to 82%—Level 2 and to 95%—Level 3 (Indoor close) and 71% (Indoor far) for database labeled as Samsung S4 Zoom) based on our proposed architecture. Experimental results show that CNNs, when properly designed, can be a useful tool in multi-sensor mobile face recognition settings, even though a limited mobile dataset is used.

Figure 19A:
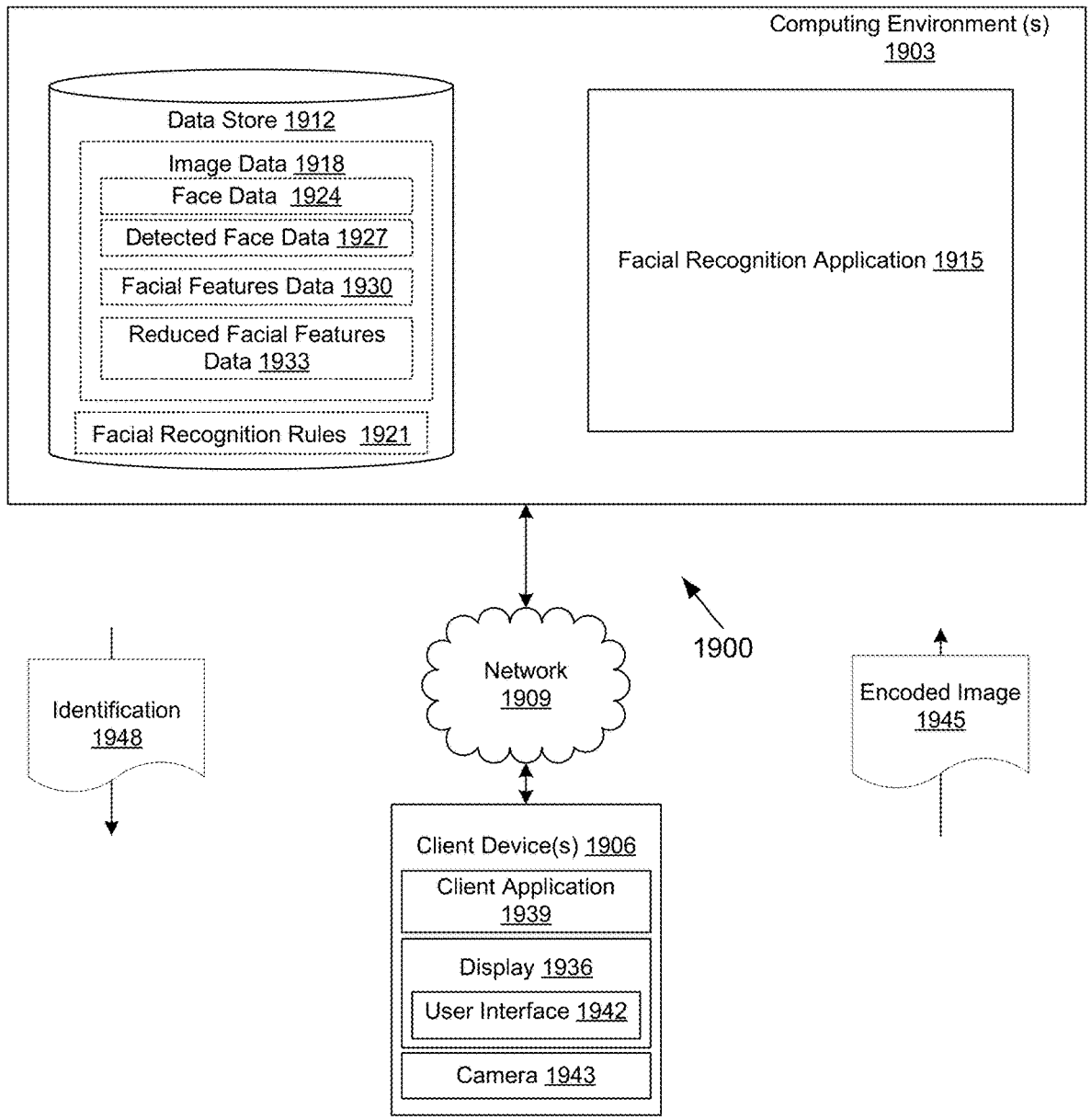
FIG. 19A is a drawing of an example of a networked environment according to various embodiments of the present disclosure.

With reference to FIG. 19A, shown is an example of a networked environment 1900 according to various embodiments. The networked environment 1900 includes a computing environment 1903 and a client 1906 in data communication with each other via a network 1909. The network 1909 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 1903 may comprise, for example, a server computer or any other system providing computing capability. Alternatively, the computing environment 1903 may employ a plurality of computing devices that may be arranged, for example, in one or more server banks or computer banks or other arrangements. Such computing devices may be located in a single installation or may be distributed among many different geographical locations. For example, the computing environment 1903 may include a plurality of computing devices that together may comprise a hosted computing resource, a grid computing resource, and/or any other distributed computing arrangement. In some cases, the computing environment 1903 may correspond to an elastic computing resource where the allotted capacity of processing, network, storage, or other computing-related resources may vary over time.

Various applications and/or other functionality may be executed in the computing environment 1903 according to various embodiments. Also, various data is stored in a data store 1912 that is accessible to the computing environment 203. The data store 1912 may be representative of a plurality of data stores 1912 as can be appreciated. The data stored in the data store 1912, for example, is associated with the operation of the various applications and/or functional entities described below.

The components executed on the computing environment 1903, for example, include the facial recognition application 1915, and other applications, services, processes, systems, engines, or functionality not discussed in detail herein. The facial recognition application 1915 is executed to process a captured image and identify the person associated with the image according to various embodiments of the present disclosure. The facial recognition application 1915 can receive an encoded image 1945 from the client 1906 and make an identification of the subject in the encoded image 1945 according to various embodiments. The facial recognition application 1915 can transmit the identification 1948 to the client 1906.

The data stored in the data store 1912 includes, for example, image data 1918, facial recognition rules 1921, and potentially other data. The image data 1918 includes image data that has been classified according to the various embodiments of the present disclosure. The image data 1918 can include face data 1924, detected face data 1927, facial features data 1930, reduced facial features data 1933, and other data. The face data 1924 can include a collection of raw face images of individuals. The face images can include indoor and outdoor images, images taken from different types of mobile devices, images taken at different angles, and/or any other type of raw data. The detected face data 1927 can include data associated with the detected face from the raw images. The facial features data 1930 can include facial features associated with the face images. The reduced facial features data 1933 can include a reduction of facial features corresponding to the detected face images. Although the image data 1918 is shown as being local to the computing environment 1903, the image data 1918 can be stored in a remote data store as can be appreciated.

The facial recognition rules 1921 can include rules, models, or configuration data for the various algorithms or approaches employed by the facial recognition application 1915. For example, the facial recognition rules 1921 can include the various algorithms used by the facial recognition application 1915 to identify the face in image captured by the client 1906.

The client 1906 is representative of a plurality of client devices that may be coupled to the network 1909. The client 1906 may comprise, for example, a processor-based system such as a computer system. Such a computer system may be embodied in the form of a desktop computer, a mobile device, a laptop computer, personal digital assistants, cellular telephones, smartphones, set-top boxes, music players, web pads, tablet computer systems, game consoles, electronic book readers, smartwatches, head mounted displays, voice interface devices, or other devices. The client 1906 may include a display 1936. The display 1936 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 1906 may be configured to execute various applications such as a client application 1939 and/or other applications. The client application 1939 may be executed in a client 1906, for example, to access network content served up by the computing environment 1903 and/or other servers, thereby rendering a user interface 1942 on the display 1936. To this end, the client application 1939 may comprise, for example, a browser, a dedicated application, etc., and the user interface 1942 may comprise a network page, an application screen, etc. The client 1906 may be configured to execute applications beyond the client application 1939 such as, for example, email applications, social networking applications, word processors, spreadsheets, and/or other applications. The client 1906 can include one or more cameras 1943 or other suitable image capturing device. The camera(s) 1943 can be used to capture an image of a person. The image can be used by the facial recognition application 1915 to identify the subject in the image according to the various embodiments of the present disclosure. The camera 1943 can comprise a front end camera, a backend camera, and/or other camera as can be appreciated. The camera 1943 can include telephoto capabilities (distance acquisition of 10 or more meters), wide angle capabilities (scene capturing), narrow angle capabilities (, low light condition capabilities, and/or other types of features as can be appreciated. In addition, the camera 1943 can generate a lower quality images or a higher quality images. The camera 1943 can have a depth map of around 12 megapixels, with about 1,200 layers of depth data. In some examples, the camera 1943 can take a minimum of five exposures, capture around 60 to 240 megapixels of data and reduce the data to a 12 megapixel photo. In some examples, the camera 1943 can capture images in RAW DNG format and blend a composite of the images to generate the captured image.

Figure 19B:
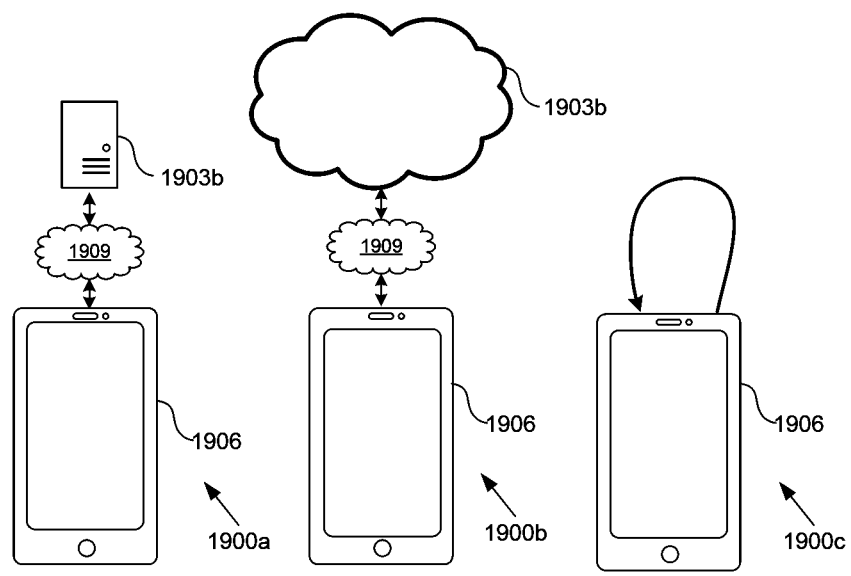
FIG. 19B illustrates examples of alternative networked environments in accordance to various embodiments of the present disclosure.

While FIG. 19A illustrates one example of a network environment in which the methods and system of the present disclosure can be implemented, FIG. 19B illustrates examples of the different types of environments in which the methods and systems of the present disclosure can be implemented. A photo captured via a mobile device 1906 (see FIG. 20) is used in accordance to the various embodiments of the present disclosure for facial recognition. As shown in FIG. 19B, the processing associated with the facial recognition can be performed via a local server host 1903*a*, a cloud host 1903*b*, locally on the mobile device 1906, and/or any other device as can be appreciated. For example, in some embodiments, the client application 1939 can be in data communication over a network 1909 with a local server host 1903*a*. The local server host can be configured to receive an encoded image 1945 obtained from the mobile device 1906 over a network 1909. Once the local server host 1903*a* has obtained the encoded photo 1945, the local server host 1903*a* can be configured to decode the encoded photo 1945 and via facial recognition application(s) 1915 executing on the local server host 1903*a*, identify the individual in the photo, and transmit an identification 1948 of the subject to the client 1906 in accordance to the various embodiments of the present disclosure.

In other embodiments, the client application 1939 executing on a mobile device can be in data communication over a network 1909 with a cloud server host 1903*b*. Like the local server host 1903*a*, the cloud server host 1903*b* can be configured to identify, via the facial recognition applications (s) 1915, individuals from photos obtained from the mobile device 1906 in accordance to the various embodiments of the present disclosure. In other embodiments, the mobile device 1906 is configured to execute facial recognition application(s) 1915 for identifying individuals in captured photos in accordance to the various embodiments of the present disclosure.

Figure 21:
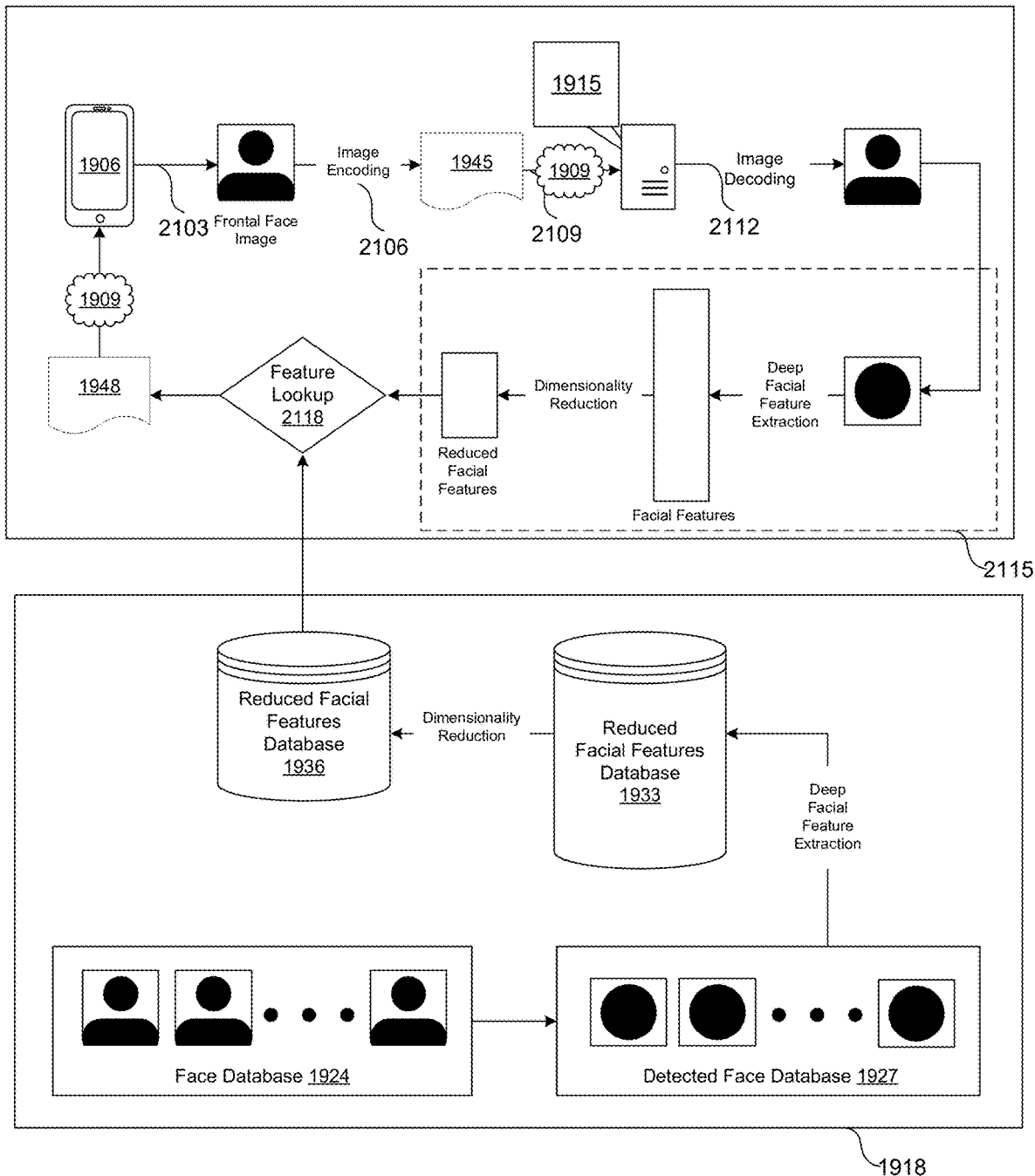
FIG. 21 is a flowchart illustrating one example of functionality implemented as portions of the mobile device application and facial recognition applications executed in a computing environment, in accordance to various embodiments of the present disclosure.

Moving on to FIG. 21, shown is an example of a flowchart illustrating examples of functionality implemented a portions of the facial recognition applications executed in a computing environment according to various embodiments of the present disclosure. It is understood that the flowchart of FIG. 21 provides merely an example of the many different types of functional arrangements that may be employed to implement the operation of the portion of the facial recognition application(s) as described herein. As an alternative, the flowchart of FIG. 21 may be viewed as depicting an example of elements of a method implemented in the computing environment according to one or more embodiments.

Figure 20:
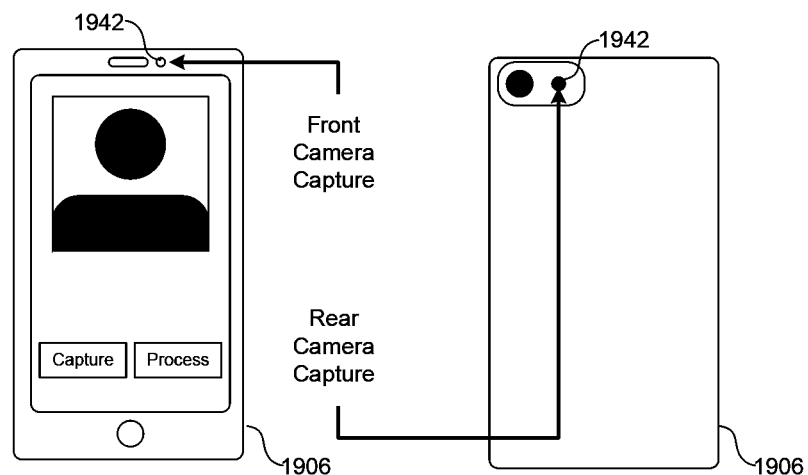
FIG. 20 is an example of how a mobile device can capture images in accordance to various embodiments of the present disclosure.

To begin, at step 2103, a frontal face image is captured via the camera 1943 upon direction of the client application 1939 executing on a mobile device 1906 (see FIG. 20). At step 2106, once the frontal face image is captured, the client application 1939 encodes the image to generate an encoded image 1945. For example, the front face image can be encoded as a JPEG and/or any other type of encoded image 1945 as can be appreciated. At step 2109, the encoded image 1945 is transmitted to the facial recognition application (s) 1915. As discussed with reference to FIG. 19, the encoded image 1945 can be transmitted to a local server host 1903*a*, a cloud server host 1903*b*, and/or any other computing device executing the facial recognition application(s) 1915 as can be appreciated. In various embodiments, the encoded image is transmitted wirelessly. In some embodiments, the facial recognition application(s) 1915 are being executed locally on the mobile computing devices 1906. In such cases, the encoded image 1945 is not transmitted to another device.

At step 2112, following receipt of the encoded images, the facial recognition application(s) 1915 decodes the encoded image 1945. At step 2115, the face is detected and facial features are identified in accordance to the various embodiments of the present disclosure. For example, the face can be detected in the image via a cascaded adaboost classifier and the facial features can be further reduced. At step 2118, the facial recognition application(s) 1915 compares the reduced facial features to one or more face databases in the image data 1918. The image data 1918 can be classified in accordance to the various embodiments of the present disclosure. Upon identification of the face in the captured photo using the one or more face databases in the image data 1918, the facial recognition application 1915 transmits an identification 1948 to the client application 1939 executing on the mobile device 1906.

Figure 22:
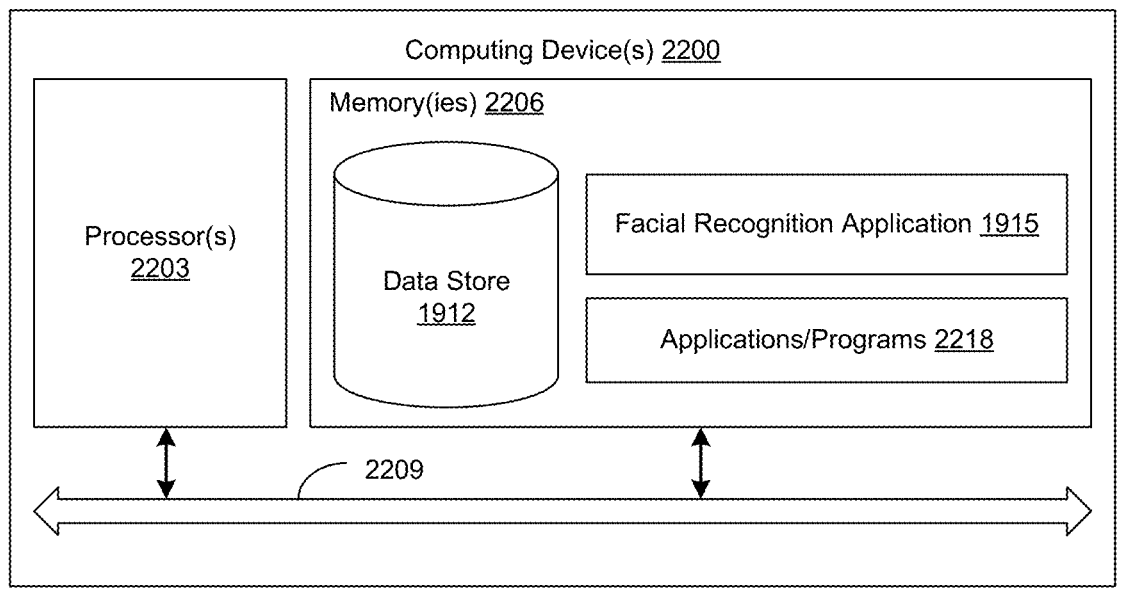
FIG. 22 is a schematic block diagram that provides one example illustration of a computing environment according to various embodiments of the present disclosure.

With reference now to FIG. 22, shown is one example of at least one computing device 2200 (e.g., an interfacing device, central server, server, or other network device) that performs various functions of the facial recognition algorithms in accordance with various embodiments of the present disclosure. Each computing device 2200 includes at least one processor circuit, for example, having a processor 2203 and a memory 2206, both of which are coupled to a local interface 2209. To this end, each computing device 2200 may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 2209 may comprise, for example, a data bus with an accompanying address/control bus or other bus structure as can be appreciated. Each computing device 2200 can include a display for rendering of generated graphics such as, e.g., a user interface and an input interface such, e.g., a keypad or touch screen to allow for user input. In addition, each computing device 2200 can include communication interfaces (not shown) that allows each computing device 2200 to communicatively couple with other communication devices. The communication interfaces may include one or more wireless connection(s) such as, e.g., Bluetooth or other radio frequency (RF) connection and/or one or more wired connection(s).

Stored in the memory 2206 are both data and several components that are executable by the processor 2203. In particular, stored in the memory 2206 and executable by the processor 2203 are facial recognition application(s) 1915, and/or other applications 2218. Facial recognition applications 1915 can include applications that interact with the client application 1939 to receive images from individuals and identify individuals within images by reducing facial features according to parameters defined by a device type and various conditions (e.g., lighting conditions, standoff distance, etc.) and comparing the reduced features with reduced features associated with a gallery of images stored in a database. It is understood that there may be other applications that are stored in the memory 2206 and are executable by the processor 2203 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, LabVIEW® or other programming languages.

A number of software components are stored in the memory 2206 and are executable by the processor 2203. In this respect, the term "executable" means a program file that is in a form that can ultimately be run by the processor 2203. Examples of executable programs may be, for example, a compiled program that can be translated into machine code in a format that can be loaded into a random access portion of the memory 2206 and run by the processor 2203, source code that may be expressed in proper format such as object code that is capable of being loaded into a random access portion of the memory 2206 and executed by the processor 2203, or source code that may be interpreted by another executable program to generate instructions in a random access portion of the memory 2206 to be executed by the processor 2203, etc. An executable program may be stored in any portion or component of the memory 2206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2206 is defined herein as including both volatile and nonvolatile memory and data storage components. Volatile components are those that do not retain data values upon loss of power. Nonvolatile components are those that retain data upon a loss of power. Thus, the memory 2206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2203 may represent multiple processors 2203 and the memory 2206 may represent multiple memories 2206 that operate in parallel processing circuits, respectively. In such a case, the local interface 2209 may be an appropriate network that facilitates communication between any two of the multiple processors 2203, between any processor 2203 and any of the memories 2206, or between any two of the memories 2206, etc. The local interface 2209 may comprise additional systems designed to coordinate this communication, including, for example, performing load balancing. The processor 2203 may be of electrical or of some other available construction.

Although the facial recognition application(s) 1915, other application(s) 2218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the facial recognition application(s) 1915 and/or application (s) 2218, that comprises software or code can be embodied in any non-transitory computer-readable medium for use by or in connection with an instruction execution system such as, for example, a processor 2203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A system, comprising:
   at least one computing device; and
   at least one application executable on the at least one computing device, wherein, when executed, the at least one application causes the at least one computing device to at least:
      obtain a first image of an individual from a client device;
      determine an image category for the first image based at least in part on a hierarchical classification that classifies by applying machine or deep learning algorithms to:
         determine a mobile device type of a mobile device used to capture the first image, the mobile device comprising a smartphone or a tablet, and the mobile device type comprising a smartphone type or a tablet type;
         determine whether the first image is captured indoors or outdoors following determining the mobile device type; and
         determine a standoff distance of the first image following determining whether the first image is captured indoors or outdoors;
      generate a reduced set of facial features based at least in part, on an initial set of facial features and a plurality of parameters that are based at least in part on the image category;
      compare the reduced set of facial features of the first image with individual reduced sets of facial features associated with a plurality of second images within a database;
      identify the individual within the first image based at least in part on the comparison; and
      transmit data encoding an identification of the individual to the client.

2. The system of claim 1, wherein the database comprises at least one of a CASIA face database or a Labeled Faces in the Wild (LFW) face database.

3. The system of claim 1, wherein identification of the individual occurs in less than 0.1 seconds.

4. The system of claim 1, wherein, when executed, the at least one application further causes the at least one computing device to at least generate the database, the database being generated by:
   receiving the plurality of second images from at least one other computing device;
   for individual second images of the plurality of second images:
      identifying a respective image category based at least in part on at least one of a respective mobile device type associated with a respective second image, whether the respective second image is captured indoors or outdoors, and a respective standoff distance;
      determining a first set of second image facial features; and
      determining a second set of second image facial features based at least in part on the respective image category; and
   storing the plurality of second images in a data store, the plurality of second images being classified according to the first set of second image facial features and the second set of second image facial features.

5. The system of claim 1, wherein, when executed, the at least one application further causes the at least one computing device to at least detect a face within the first image.

6. The system of claim 1, wherein, when executed, the at least one application further causes the at least one computing device to at least classify the standoff distance as a close distance or a far distance.

7. The system of claim 1, wherein, when executed, the at least one application further causes the at least one computing device to at least extract the initial set of facial features from the first image.

8. The system of claim 1, wherein the first image is encoded, and when executed, the at least one application further causes the at least one computing device to at least decode the first image in response to obtaining the first image from the client.

9. A system, comprising:
   a mobile device comprising a smartphone or a tablet; and
   at least one application executable on the first computing device, wherein, when executed, the at least one application causes the first computing device to at least:
      capture an image of an individual using the mobile device;
      transmit the image to a second computing device, the second computing device being configured to;
         determine an image category for the image based at least in part on a hierarchical classification that classifies by applying machine or deep learning algorithms to:
            determine a mobile device type of the mobile device used to capture the image, the mobile device type comprising a smartphone type or a tablet type;
            determine whether the image is captured indoors or outdoors following determining the mobile device type; and
            determine a standoff distance of the image following determining whether the image is captured indoors or outdoors;
         generate a reduced set of facial features based at least in part on an initial set of facial features and a plurality of parameters that are based at least in part on the image category;
         identify the individual in the image based at least in part on a comparison of the reduced set of facial features of the image with individual reduced sets of facial features associated with a database of images categorized according to mobile device type, a lighting type, and a standoff distance;

receive an identification of the individual from the second computing device; and render a user interface including the identification for display via the first computing device.

10. The system of claim 9, wherein, when executed, the at least one application causes the first computing device to at least encode the image.

11. The system of claim 9, wherein the identification is made in less than 0.1 seconds.

12. A method, comprising:

obtaining, via at least one computing device, a first image of a subject captured from a mobile device comprising a smartphone or a tablet;

determining, via the at least one computing device, an image category associated with the first image based at least in part on a hierarchical classification that classifies by applying machine or deep learning algorithms to:

determine a mobile device type of the mobile device used to capture the first image, the mobile device type comprising a smartphone type or a tablet type;

determine whether the first image is captured indoors or outdoors following determining the mobile device type; and determine a standoff distance of the first image following determining whether, the first image is captured indoors or outdoors:

determining, via the at least one computing device, an initial set of facial features of a face detected within the first image;

generating, via the at least one computing device, a reduced set of facial features based at least in part on the image category and the initial set of facial features;

comparing, via the at least one computing device, the reduced set of facial features with individual reduced sets of facial features associated with a plurality of second images in a database; and identifying, via the at least one computing device, the subject based at east in part on the comparison.

13. The method of claim 12, wherein the first image of the subject is captured by a camera on the mobile device, and wherein obtaining the first image comprises receiving the first image from the mobile device.

14. The method of claim 12, wherein the image category is based at least in part on a hierarchical classification according to the mobile device type, the lighting type, and the standoff distance.

15. The method of claim 14, wherein the standoff distance is classified as a far distance or a near distance.

16. The method of claim 12, further comprising generating the database by:

receiving the plurality of second images from at least one other computing device;

for individual second images of the plurality of second images:

identifying a respective image category based at least in part on at least one of a respective mobile device type associated with a respective second image, whether the respective second image is captured indoors or outdoors, and a respective standoff distance;

determining a first set of second image facial features;

determining a second set of second image facial features based at least in part on the image category; and storing the plurality of second images in the database, the plurality of second images being classified according to the first set of second image facial features and the second set of second image facial features.

17. The method of claim 12, wherein the database comprises at least one of a CASIA face database or a Labeled Faces in the Wild (LFW) face database.

* * * * *